US012586257B2

(12) United States Patent
Gao

(10) Patent No.: US 12,586,257 B2
(45) Date of Patent: Mar. 24, 2026

(54) METHOD FOR ENCODING AND DECODING A 3D POINT CLOUD, ENCODER, DECODER

(71) Applicant: Beijing Xiaomi Mobile Software Co., Ltd., Beijing (CN)

(72) Inventor: Shuo Gao, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/852,799

(22) PCT Filed: Mar. 31, 2022

(86) PCT No.: PCT/CN2022/084542
§ 371 (c)(1),
(2) Date: Sep. 30, 2024

(87) PCT Pub. No.: WO2023/184393
PCT Pub. Date: Oct. 5, 2023

(65) Prior Publication Data
US 2025/0252610 A1 Aug. 7, 2025

(51) Int. Cl.
*G06T 9/40* (2006.01)
*G06T 9/00* (2006.01)
*H04N 19/597* (2014.01)

(52) U.S. Cl.
CPC ..................................... *G06T 9/40* (2013.01)

(58) Field of Classification Search
None
See application file for complete search history.

(56) References Cited

U.S. PATENT DOCUMENTS

| | | | |
|---|---|---|---|
| 10,192,353 B1 | 1/2019 | Chou et al. | |
| 2009/0167763 A1* | 7/2009 | Waechter | G06T 15/40 |
| | | | 345/426 |
| 2021/0319595 A1 | 10/2021 | Ray et al. | |

OTHER PUBLICATIONS

International Search Report dated Oct. 5, 2022 for PCT International Application No. PCT/CN2022/084542.
Written Opinion dated Oct. 5, 2022 for PCT International Application No. PCT/CN2022/084542.
Antoine Dricot et al. "Adaptive Multi-level Triangle Soup for Geometry-based Point Cloud Coding", 2019 IEEE 21st International Workshop on Multimedia Signal Processing (MMSP), Sep. 27, 2019, 6 pages.

(Continued)

*Primary Examiner* — Christopher Braniff
(74) *Attorney, Agent, or Firm* — Volpe Koenig

(57) ABSTRACT

Method for decoding, from a bitstream, the geometry of a 3D point cloud by decoding information constituting a geometrical representation of the geometry, preferably implemented in a decoder, including: receiving and decoding a bitstream, wherein the bitstream contains octree information including information about octree structure of the volume of the point cloud and vertex information including information about vertex presence and position of a vertex on edges of the cuboids; determining triangles by connecting the vertices of one cuboid of the octree structure; voxelization of the triangles to determine points of the point cloud, wherein at least one triangle is extended at along at least one side for voxelization.

19 Claims, 7 Drawing Sheets

(56) References Cited

OTHER PUBLICATIONS

Ohji Nakagami(SONY)."PCC on Trisoup decode in G-PCC", 124. MPEG Meeting;Oct. 8, 2018-Oct. 12, 2018 Macao; (Motion Picturet Expert Group or ISO/IEC JTC1/SC29/WG11)No. m44706, Oct. 9, 2018, 5 pages.

Alexander Schier et al."Fast texture mapping for triangle soups using electrostatic monopole feld lines",Computers & Graphics Elsevier, GB, vol. 77, Oct. 12, 2018, 16 pages.

"Convenor report of the 6' WG 7 meeting",137.MPEG Meeting;Jan. 17, 2022-Jan. 21, 2022 Online;(Motion Picturet Expert Group or ISO/IEC JTC1/SC29/WG11)No. n21121, Mar. 24, 2022, 53 pages.

Khaled Mammou et al."G-PCC codee description v2", 125.MPEG Meeting;Jan. 14, 2019-Jan. 18, 2019 Marrakech; (Motion Picturet Expert Group or ISO/IEC JTC1/SC29/WG11)No. N18189, Feb. 22, 2019, 39 pages.

Unno Kyohei et al."m58776 Refinement of Trisoup variable node size extension for improving subjective quality", Feb. 22, 2019, 12 pages.

"EE 13.50 on Triangle soup",138.MPEG Meeting;Apr. 25, 2022-Apr. 29, 2022 Online;(Motion Picturet Expert Group or ISO/IEC JTC1/SC29/WG11)No. n21576, May 26, 2019, 6 pages.

Lasserre (Xiaomi)S:"[GPCC][Trisoup]Part 5 Improved rendering from triangles", 138.MPEG Meeting;Apr. 25, 2022-Apr. 29, 2022 Online;(Motion Picturet Expert Group or ISO/IEC JTC1/SC29/WG11) No. m59292, Apr. 12, 2022, 15 pages.

* cited by examiner

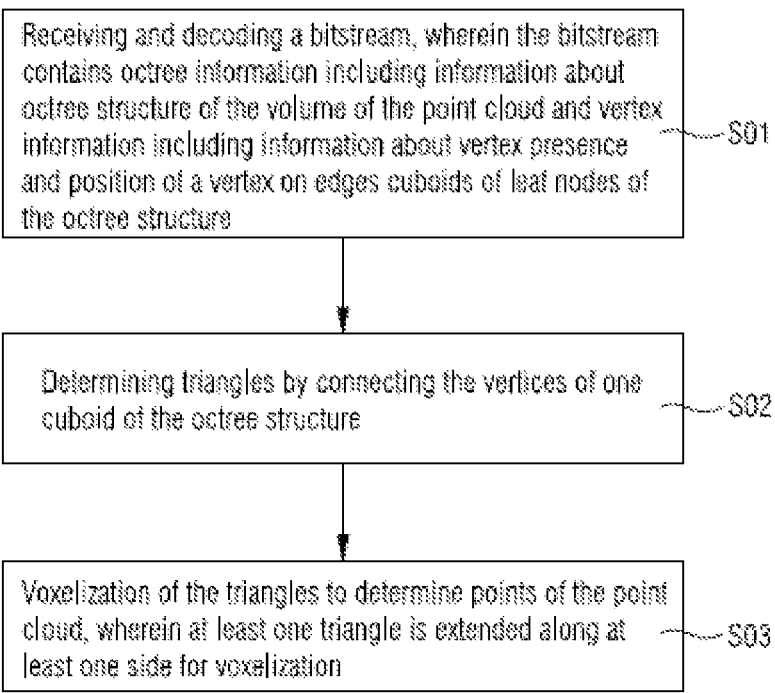

Receiving and decoding a bitstream, wherein the bitstream contains octree information including information about octree structure of the volume of the point cloud and vertex information including information about vertex presence and position of a vertex on edges cuboids of leaf nodes of the octree structure — S01

Determining triangles by connecting the vertices of one cuboid of the octree structure — S02

Voxelization of the triangles to determine points of the point cloud, wherein at least one triangle is extended along at least one side for voxelization — S03

FIG.1

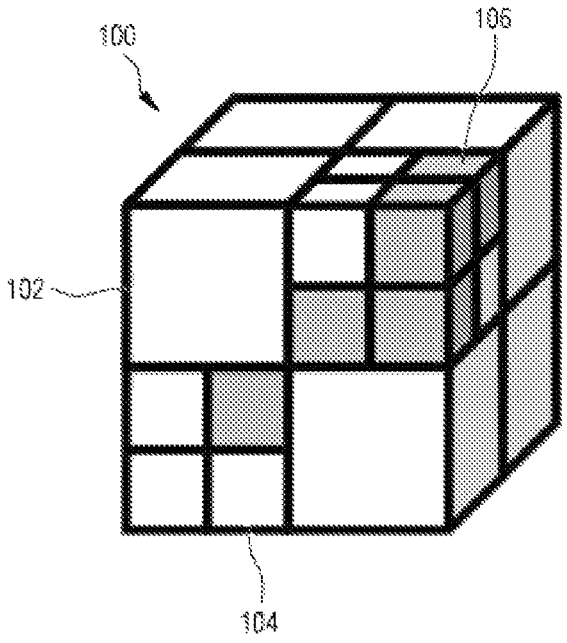

FIG.2

Occupancy bytes:
10000100 00001000 11000011

METHOD FOR ENCODING AND DECODING A 3D POINT CLOUD, ENCODER, DECODER

CROSS REFERENCE TO RELATED APPLICATIONS

This application is a National Stage of International Application No. PCT/CN2022/084542, filed on Mar. 31, 2022, the disclosure of which is incorporated herein by reference in its entirety for all purposes.

TECHNICAL FIELD

The present invention relates to a method for decoding a three-dimensional (3D) point cloud from a bitstream. Additionally, it is an object of the present invention to provide a method for encoding a 3D point cloud into a bitstream. Further, it is an object of the present invention to provide an encoder and decoder, a bitstream encoded according to the present invention, and software. In particular, it is an object of the present invention to provide a method with increased accuracy of the decoding or reconstruction process of a 3D point cloud.

BACKGROUND

As a format for the representation of 3D data, point clouds have recently gained traction as they are versatile in their capability in representing all types of 3D objects or scenes. Therefore, many use cases can be addressed by point clouds, among which are: movie post-production, real-time 3D immersive telepresence or VR/AR applications, free viewpoint video (for instance for sports viewing), Geographical Information Systems (aka cartography), culture heritage (storage of scans of rare objects into a digital form), and/or autonomous driving, including 3D mapping of the environment and real-time Lidar data acquisition.

A point cloud is a set of points located in a 3D space, optionally with additional values attached to each of the points. These additional values are usually called point attributes. Consequently, a point cloud is a combination of geometry (the 3D position of each point) and attributes.

Attributes may be, for example, three-component colors, material properties like reflectance and/or two-component normal vectors to a surface associated with the point.

Point clouds may be captured by various types of devices, like an array of cameras, depth sensors, Lidars, scanners, or may be computer-generated (in movie post-production, for example). Depending on the use cases, point clouds may have from thousands to up to billions of points for cartography applications.

Raw representations of point clouds require a very high number of bits per point, with at least a dozen bits per spatial component X, Y, or Z, and optionally more bits for the attribute(s), for instance, three times 10 bits for the colors. Practical deployment of point-cloud-based applications requires compression technologies that enable the storage and distribution of point clouds with reasonable storage and transmission infrastructures.

Compression may be lossy (like in video compression) for the distribution to and visualization by an end-user, for example, on AR/VR glasses or any other 3D-capable device. Other use cases do require lossless compression, like medical applications or autonomous driving, to avoid altering the results of a decision obtained from the analysis of the compressed and transmitted point cloud.

Until recently, point cloud compression (aka PCC) was not addressed by the mass market, and no standardized point cloud codec was available. In 2017, the standardization working group ISO/JCT1/SC29/WG11, also known as Moving Picture Experts Group or MPEG, initiated work items on point cloud compression. This has led to two standards, namely: MPEG-I part 5 (ISO/IEC 23090-5) or Video-based Point Cloud Compression (V-PCC) and MPEG-I part 9 (ISO/IEC 23090-9) or Geometry-based Point Cloud Compression (G-PCC).

Both V-PCC and G-PCC standards have finalized their first version in late 2020 and will soon be available to the market.

The V-PCC coding method compresses a point cloud by performing multiple projections of a 3D object to obtain two dimensional (2D) patches that are packed into an image (or a video when dealing with moving point clouds). Obtained images or videos are then compressed using already existing image/video codecs, allowing for the leverage of already deployed image and video solutions. By its very nature, V-PCC is efficient only on dense and continuous point clouds because image/video codecs are unable to compress non-smooth patches as would be obtained from the projection of, for example, Lidar-acquired sparse geometry data.

The G-PCC coding method has two schemes for the compression of the geometry.

The first scheme is based on an occupancy tree (octree/quadtree/binary tree) representation of the point cloud geometry. Occupied nodes are split down until a certain size is reached, and occupied leaf nodes provide the location of points, typically at the center of these nodes. By using neighbor-based prediction techniques, a high level of compression can be obtained for dense point clouds. Sparse point clouds are also addressed by directly coding the position of points within a node with non-minimal size, by stopping the tree construction when only isolated points are present in a node; this technique is known as Direct Coding Mode (DCM).

The second scheme is based on a predictive tree, each node representing the 3D location of one point, and the relation between nodes is spatial prediction from parent to children. This method can only address sparse point clouds and offers the advantage of lower latency and simpler decoding than the occupancy tree. However, compression performance is only marginally better, and the encoding is complex, relatively to the first occupancy-based method, which intensively looks for the best predictor (among a long list of potential predictors) when constructing the predictive tree.

In both schemes, attribute (de) coding is performed after complete geometry (de) coding, leading to a two-pass coding. Thus, low latency is obtained by using slices that decompose the 3D space into sub-volumes that are coded independently, without prediction between the sub-volumes. This may heavily impact the compression performance when many slices are used.

An important use case is the transmission of dynamic AR/VR point clouds. Dynamic means that the point cloud evolves with respect to time. Also, AR/VR point clouds are typically locally 2D as they most of the time represent the surface of an object. As such, AR/VR point clouds are highly connected (or said to be dense) in the sense that a point is rarely isolated and, instead, has many neighbors.

Dense (or solid) point clouds represent continuous surfaces with a resolution such that volumes (small cubes called voxels) associated with points touch each other without exhibiting any visual hole in the surface.

Such point clouds are typically used in AR/VR environments and are viewed by the end user through a device like a TV, a smartphone, or a headset. They are transmitted to the device or stored locally. Many AR/VR applications use moving point clouds, as opposed to static point clouds, that vary with time. Therefore, the volume of data is huge and must be compressed. Nowadays, lossless compression based on an octree representation of the geometry of the point cloud can achieve down to slightly less than a bit per point (1 bpp). This may not be sufficient for real-time transmission that may involve several million points per frame with a frame rate as high as 50 frames per second (fps), thus leading to hundreds of megabits of data per second.

Consequently, lossy compression may be used with the usual requirement of maintaining an acceptable visual quality while compressing sufficiently to fit within the bandwidth provided by the transmission channel, while maintaining real-time transmission of the frames. In many applications, bitrates as low as 0.1 bpp (10× more compressed than lossless coding) would already make possible real-time transmission.

The codec VPCC, based on MPEG-I part 5 (ISO/IEC 23090-5) or Video-based Point Cloud Compression (V-PCC), can achieve such low bitrates by using lossy compression of video codecs that compress 2D frames obtained from the projection of the point cloud on a plane. The geometry is represented by a series of projection patches assembled into a frame, each patch being a small local depth map. However, VPCC is not versatile and is limited to a narrow type of point clouds that do not exhibit locally complex geometry (like trees, hair) because the obtained projected depth map would not be smooth enough to be efficiently compressed by a video codec.

Purely 3D compression techniques can handle any type of point clouds. It is still an open question whether 3D compression techniques can compete with VPCC (or any projection plus image coding scheme) on dense point clouds. Standardization is still underway toward offering an extension (an amendment) of GPCC that would provide competitive lossy compression that would compress dense point clouds as well as VPCC intra while maintaining the versatility of GPCC that can handle any type of point clouds (dense, Lidar, 3D maps). This extension is likely to use the so-called TriSoup coding scheme that works over to an octree. TriSoup is under exploration in the standardization working group JTC1/SC29/WG7 of ISO/IEC. TriSoup encoding is also known as A. DRICOT, et al, "*Adaptive multi-level triangle soup for geometry—based point cloud coding*", 2019, IEEE 21st international workshop on multimedia signal processing (MMSP), Nakagami O.: "report on triangle soup decoding", ISO/IEC JTC1/SC29-WG11 m52279, 2020, and U.S. Pat. No. 10,192,353.

However, as for all lossless compression schemes, the quality of reconstruction of the points of the point cloud is essential.

SUMMARY

In a first aspect, a method for decoding the geometry of a 3D point cloud from a bitstream is provided, preferably implemented in a decoder. The method includes: receiving and decoding a bitstream, wherein the bitstream contains octree information including information about octree structure of the volume of the point cloud and vertex information including information about vertex presence and position of a vertex on edges of cuboids of leaf nodes of the octree structure; determining triangles by connecting the vertices of one cuboid relating to a leaf node of the octree structure; and voxelization of the triangles to determine points of the point cloud. Wherein at least one triangle is extended along at least one side for voxelization.

Thus, in a first step, a bitstream is received and the bitstream contains information regarding the octree structure of the volume of the point cloud, which is decoded. Preferably, the geometry of the Point cloud is GPCC-encoded. Thus, by decoding from the bitstream, the octree information about the volume of the point could be provided. Further, the bitstream also includes vertex information, including information about vertex presence and the position of a vertex on the edges of the cuboids relating to leaf nodes in the octree structure. Thus, the vertex information is provided by decoding from the bitstream. Therein, the bitstream is preferably encoded by a TriSoup encoding scheme at the encoder.

After decoding the octree information and vertex information from the bitstream, which is described in the previous one step, in a further step, for reconstructing the point cloud geometry, triangles are determined for each cuboid by connecting the vertices on the edges of the cuboids. Thus, the surfaces of the triangles are determined by the position of the vertices included in the bitstream. In order to reconstruct the points of the point cloud from the triangles, voxelization is performed by a ray-tracing process wherein in the ray-tracing process rays are launched along the three directions parallel to any of the three axes. Their origin is a point of integer coordinates corresponding to the sampling precision wanted for the rendering. The intersection point (if any) of the ray with one of the triangles is then determined and added to the list of rendered points, i.e., added to the points of the point cloud. The surface of the triangles is sampled by the rays during voxelization in order to determine the points of the point cloud.

Therein, according to the present invention, at least one triangle is extended along at least one side for/during voxelization to extend the surface of the triangle along at least one direction. Thus, by the extension of the triangle in the voxelization process, the accuracy of the voxelization process can be enhanced, since additional points of the original point cloud can be reliably determined, which would otherwise be neglected during the voxelization process. Since the triangles are sampled with a certain precision and sampling resolution, points of the point cloud that are just outside the triangle are now captured by extending the triangle along at least one side in order to enlarge the surface of the triangle. Hence, higher accuracy for reconstructing the 3D point cloud is achieved, and the number of sampling errors in the process of voxelization is reduced.

Preferably, at least one triangle is extended at more than one side to further enlarge the surface of the respective triangle. Thus, the triangle can be enlarged at one side, two sides, or all three sides in order to include points of the original point cloud that are just beyond the triangle determined by the vertices on the edges of the cuboids.

Preferably, if one cuboid of a leaf node of the octree structure may contain more than one triangle, each triangle in the cuboid is extended along at least one side for voxelization. Thus, extension of the surface of the triangle may be applied to all triangles in a cuboid. Alternatively, or additionally, in each cuboid of the octree structure, the at least one triangle is extended along at least one side for voxelization. Alternatively, extension of one or more sides of triangles will be applied only to a subset of leaf nodes in the octree structure. Therein, the subset can be determined, for example, by the application, the density of the points in leaf nodes of the point cloud, or the requirements on accuracy vs. decoding speed.

Preferably, the extension is the same for each side. Thus, a triangle is extended for the same amount along at least two directions in order to enlarge the surface of the triangle. More preferably, the amount of extension is the same for all three directions. Alternatively, at least along two directions, the extension is different. Thus, different directions can be handled differently in order to enhance the accuracy of the decoding.

Preferably, the extensions are the same for each leaf node of the octree structure or are different. If there are different extensions for more than one or each side of a triangle in one leaf node of the octree structure, then this can be the same in other leaf nodes of the octree structure or can be different. Therein, the extension can be pre-selected or can be determined, for example, by the application, the density of the points in leaf nodes of the point cloud, or the requirements on accuracy vs. decoding speed.

Preferably, voxelization is performed by Möller-Trumbore algorithm.

Preferably, in the Möller-Trumbore algorithm, the convex hull requirement is relaxed to $-\varepsilon \leq u,v,w$ with $\varepsilon > 0$ and u, v, w the barycentric coordinates of the triangle. In the Möller-Trumbore algorithm, the convex hull requirement is set to be $0 \leq u,v,w$. Thus, by relaxing this requirement to be $-\varepsilon \leq u,v,w$, the surface of the considered triangle is enlarged and voxelization of points of the original point cloud that would otherwise not be considered in the reconstructed point cloud during the sampling will now be included. Thereby, quality of reconstruction and appearance of the final reconstructed point cloud is enhanced.

Preferably, the convex hull requirement is set to be $-\varepsilon_u \leq u$, $-\varepsilon_v \leq v$, and $-\varepsilon_w \leq w$ with $\varepsilon_u$, $\varepsilon_v$, $\varepsilon_w \geq 0$ and u, v, w the barycentric coordinates of the triangle. Thus, for the different direction, an individual convex hull requirement can be provided to individually control the extension of the triangle under consideration. Therein is $\varepsilon_u \neq \varepsilon_w$. Alternatively or additionally is $\varepsilon_u \neq \varepsilon_v$. Alternatively or additionally is $\varepsilon_v \neq \varepsilon_w$. Thus, the extension in one or more directions can be selected independently from the other directions to individually determine the extension.

Preferably, the extension is provided by a halo parameter. In the case of the Möller-Trumbore algorithm, the halo parameter is provided by & and for the different directions by $\varepsilon_u$, $\varepsilon_v$, and $\varepsilon_w$. Thus, by the halo parameter, the amount of extension is determined and can be quantified.

Preferably, the halo parameter is set to be less than ¼ of the sampling precision or sampling resolution of the voxelization. Thus, if the halo parameter is set to be ¼ in one direction and the sampling distance is set to be "D", then the triangle is extended in this direction by D/4. More preferably, the halo parameter is set to be less than ⅛ of the sampling precision or sampling resolution of the voxelization. Thus, by selecting the halo parameter, the amount of extension can be tailored to achieve the best result, wherein larger values will result in more points determined in the voxelization process.

Preferably, the halo parameter is set in advance. Thus, the encoder and the decoder might have agreed on the halo parameter, and thus the halo parameter is fixed for every point cloud generated by the encoder and reconstructed by the decoder. The information about the halo parameter need not be encoded into the bitstream.

Alternatively, the halo parameter is encoded into the bitstream and preferably in the geometry parameter set (GPS) of the bitstream. This can be done once in the case where the halo parameter is set for every subsequent point cloud to be decoded. Alternatively, for each point cloud individually, a respective halo parameter or a set of halo parameters can be encoded.

Alternatively, the halo parameter depends on the size of the volume of the cuboid, i.e., the level of the octree of the current leaf node.

In another aspect of the present invention, a method for encoding a 3D point cloud into a bitstream is provided, preferably implemented in an encoder. The method for encoding the 3D point cloud includes: obtaining octree information including an octree structure of a volume including a plurality of cuboids; obtaining vertex information from surfaces of the point cloud for each cuboid relating to leaf node, wherein the vertex information includes information about vertex presence and position of a vertex on edges of the cuboid; encoding the octree information and the vertex information into a bitstream; and reconstructing the point cloud geometry data by using octree information and the vertex information obtained in preceding encoding process. Wherein reconstructing the point cloud geometry data includes: determining triangles by connecting the vertices of one cuboid relating to a leaf node of the octree structure; and voxelization of the triangles to determine points of the point cloud. Wherein at least one triangle is extended along at least one side for voxelization.

Thus, by the method for encoding, the octree information as well as the vertex information are generated. This information is encoded into the bitstream. Subsequently, at the encoder side, a reconstruction step is performed. In this reconstruction step, the point cloud geometry information is reconstructed, wherein the steps of reconstructing are the same as those in the method for decoding as described above. The reconstructed geometry of the point cloud at the encoder side is then used to encode attributes (color, reflectance, . . . ) of the points of the point cloud, for example, by RAHT (Region-Adaptive Hierarchical Transform), predicting transform, or lifting transform being used in order to encode the attributes of the points of the point cloud.

Preferably, the geometry of the point cloud is encoded into the bitstream by Geometry-based Point Cloud Compression (G-PCC).

Preferably, the bitstream is an MPEG G-PCC compliant bitstream.

Preferably, the method for encoding is further built according to the features described before in connection with the method for decoding.

In another aspect of the present invention, an encoder is provided for encoding a 3D point cloud into a bitstream. The encoder comprises a memory and a processor, wherein instructions are stored in the memory, which when executed by the processor perform the steps of the method for encoding as described.

In another aspect of the present invention, a decoder is provided for decoding a 3D point cloud from a bitstream. The decoder comprises a memory and a processor, wherein instructions are stored in the memory, which when executed by the processor perform the steps of the method for decoding as described.

In another aspect of the present invention, a bitstream is provided, wherein the bitstream is encoded by the steps of the method for encoding as described.

In another aspect of the present invention, a computer-readable storage medium is provided comprising instructions to perform the steps of the method for encoding a 3D point cloud into a bitstream as described.

In another aspect of the present invention, a computer-readable storage medium is provided comprising instructions to perform the steps of the method for decoding a 3D point cloud from a bitstream as described.

BRIEF DESCRIPTION OF THE DRAWINGS

In the following, the present invention is described in more detail with reference to the accompanying figures.

FIG. 1 is a flow diagram of the method for decoding a 3D point cloud geometry according to the present invention.

FIG. 2 is a schematic drawing of an example for generation of the octree structure.

DETAILED DESCRIPTION OF THE EMBODIMENTS

Thus, it is an object of the present invention to provide a method for decoding a geometry of a 3D point cloud from a bitstream as well as encoding a 3D point cloud into a bitstream with increased accuracy.

Referring to FIG. 1, which shows a flow diagram for the method of decoding geometry information of a 3D point cloud from a bitstream.

The method for decoding the geometry of a 3D point cloud from a bitstream, preferably implemented in a decoder, includes the steps S01, S02, and S03.

In step S01, a bitstream is received and decoded, wherein the bitstream contains octree information, including information about the octree structure of the volume of the point cloud, and vertex information, including information about vertex presence and position of a vertex on edges of cuboids of leaf nodes of the octree structure.

In step S02, triangles are determined by connecting the vertices of one cuboid relating to the leaf node of the octree structure.

In step S03, voxelization of the triangles is performed to determine points of the point cloud, wherein at least one triangle is extended along at least one side before voxelization.

Figure 3:
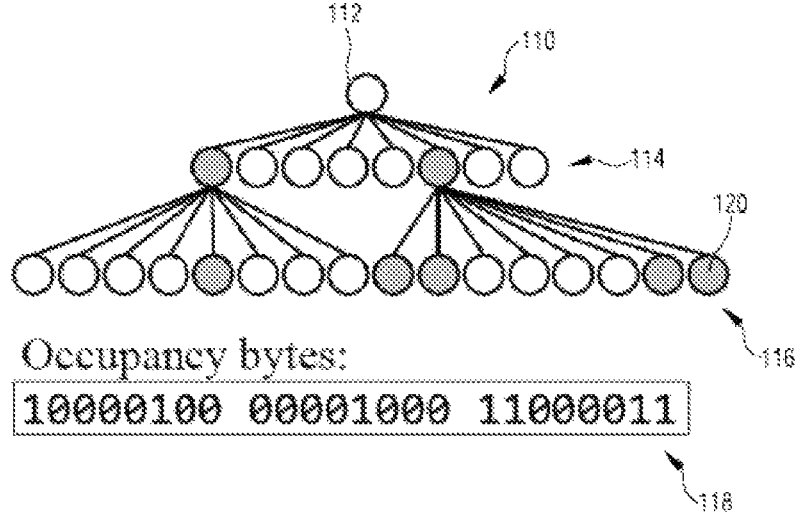
FIG. 3 is a schematic drawing of an octree according to FIG. 2.

The first step of the geometry encoding process in order to determine the octree information is to build and encode an octree, as illustrated in FIG. 2 and FIG. 3. The bounding box is the main volume 100 that contains all the points, and is associated with the root node 112 (i.e., a single node at the top of the tree 110). This volume 100 is first divided into 8 sub-volumes 102 called octants, each of which is represented by a node 114 in the tree 110. The octants 106 that are occupied by at least one point, which are shaded in FIG. 2 and FIG. 3, are then recursively split into sub-volumes 104 until a target level is reached.

Each octant (or node) is represented by an occupancy byte that contains one bit per child octant, set to one if it is occupied by at least one point, or to zero otherwise. The occupancy bytes 118 of all the octants are serialized (in breadth-first order) and entropy coded with a binary arithmetic encoder.

Figure 4:
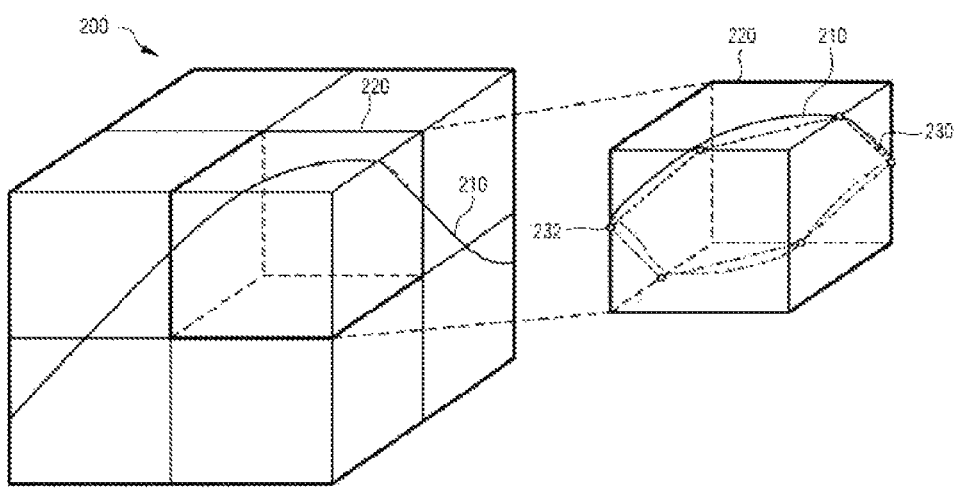
FIG. 4 is a schematic drawing of an example for determining vertices on edges of a cuboid.

FIG. 4 illustrates a blocking representation of a 3D surface 210, as well as an example of a block 220 in a TriSoup. The surface 210 intersects the block 220, which is therefore an occupied block, and the block 220 exists among multiple blocks 200 in 3D space. Within the block 220, the enclosed portion of the surface 210 intersects the edges of the block at six illustrated vertices of a polygon 230. An edge of the block 220 is said to be selected if it contains a vertex.

Figure 5:
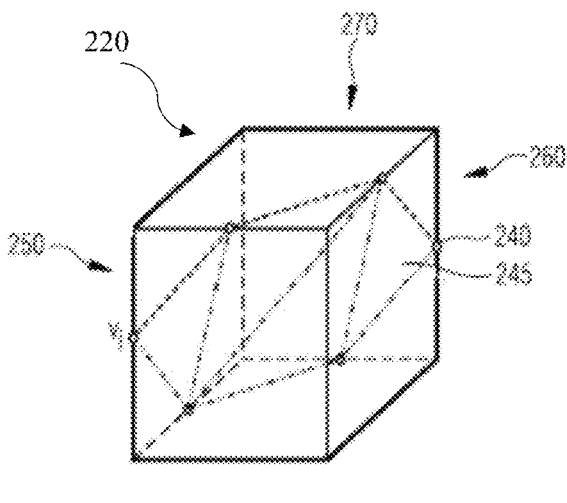
FIG. 5 is a schematic drawing of an example for generating triangles.

FIG. 5 illustrates the block 220 in the TriSoup, omitting the surface 210 for clarity, and showing a non-selected edge 270, a selected edge 260, and the i-th edge 250. Suppose the i-th edge 250 is selected. To specify a vertex vi on edge i, one specifies a scalar value to indicate a corresponding fraction of the length of the edge 250.

As illustrated in FIG. 4 and FIG. 5, within each octant 220 in the target level of the octree, the TriSoup represents the original surface 210 as a set of triangles 245. This surface is encoded and used to obtain the positions of the reconstructed (or decoded) points. First, the intersections of the surface represented by the original points with the edges of the octants are estimated by averaging the positions of the points that are closest to those edges within the octant. Secondly, the twelve edges of all the octants and their associated intersections (if any) are stored as segments and vertices, respectively. Each (unique) segment is then encoded as follows. A first single bit is arithmetically coded, set to one if the segment is occupied by a vertex and zero otherwise. If it is occupied, the relative position of the vertex on the segment is also arithmetically coded.

Figure 6:
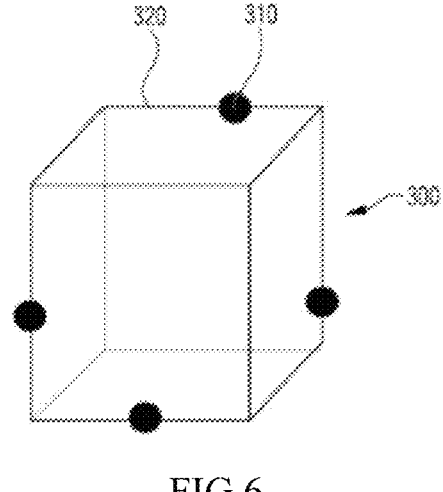
FIG. 6 is a schematic drawing of an example of vertices on the edges of a cuboid.

Vertices 310 of triangles are coded along the edges 320 of volumes associated with leaf nodes 300 of the tree, as depicted in FIG. 6. These vertices 310 on edge 320 are shared among leaf nodes 300 having a common edge 320. This means that at most one vertex is coded per edge belonging to at least one leaf node. By doing so, continuity of the model is ensured through leaf nodes.

As mentioned herein, the encoding of the TriSoup vertices requires two information per edge: a vertex flag indicating if a TriSoup vertex is present on the edge, and when present, the vertex position along the edge.

Consequently, the coded data consists of the octree data plus the TriSoup data.

The vertex flag is coded by an adaptive binary arithmetic coder that uses one specific context for coding vertex flags. The position of a vertex on an edge of length $N=2^s$ might be coded with unitary precision by pushing (bypassing/not entropy coding) s bits into the bitstream.

Figure 7:
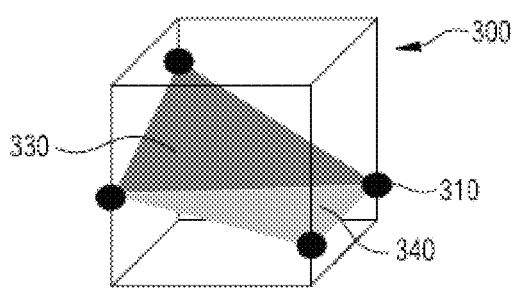
FIG. 7 is a schematic drawing of a generation of the triangle by vertices.

Inside a leaf node 300, triangles are constructed from the TriSoup vertices if at least three vertices 310 are present on the edges 320 of the leaf node 300. Reconstructed triangles 330, 340 are depicted in FIG. 7.

Obviously, other combinations of triangles 330, 340 are possible. The choice of triangles comes from a three-step process, as follows:

1. determining a dominant direction along one of the three axes; 2. ordering TriSoup vertices depending on the dominant direction; and 3. constructing a triangle based on the ordered list of vertices.

Knowledge about the exact position of the triangles within the current leaf is not necessary and can be deduced from the vertices.

Figure 8:
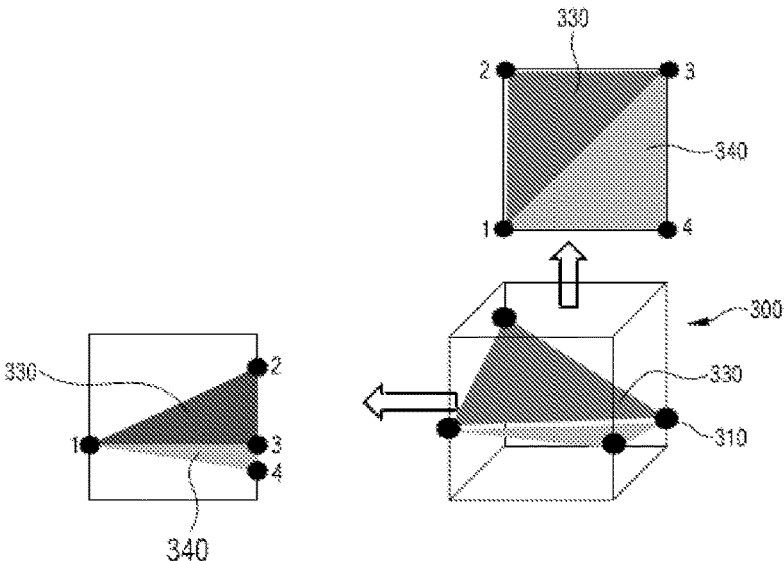
FIG. 8 is a schematic drawing of an example of determining the order of the triangles according to FIG. 7.

FIG. 8 will be used to explain this process. Each of the three axes is tested and the one maximizing the total surface area of the triangle is kept as the dominant axis. For simplicity of the figure, only the test over two axes is depicted in FIG. 8.

A first test (top) along the vertical axis is performed by projecting the cube and the TriSoup vertices 310 vertically on a 2D plane. The vertices 310 are then ordered following a clockwise order relative to the center of the projected node (a square). Then, triangles 330 and 340 are constructed following a fixed rule based on the ordered vertices. Here, triangles 123 and 134 are constructed systematically when 4 vertices are involved. When 3 vertices are present, the only possible triangle is 123. When 5 vertices are present, a fixed rule may be to construct triangles 123, 134, and 451. And so on, up to 12 vertices.

A second test (left) along a horizontal axis is performed by projecting the cube and the TriSoup vertices horizontally on a 2D plane.

The vertical projection exhibits the 2D total surface of triangles that is maximum, thus the dominant axis is selected as vertical, and the constructed TriSoup triangles are obtained from the order of the vertical projection, as in FIG. 8, inside the node. It is to be noted that taking the horizontal axis as dominant would have led to another construction of triangles.

The adequate selection of the dominant axis by maximizing the projected surface leads to a continuous reconstruction of the point cloud without holes.

The rendering of TriSoup triangles into points is performed by ray tracing. The set of all rendered points by ray tracing will make the decoded point cloud.

Figure 9:
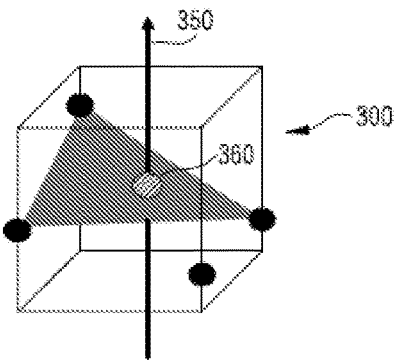
FIG. 9 is a schematic drawing for the step of voxelization.

For ray tracing as shown in FIG. 9, rays are launched along the three directions parallel to an axis 350. Their origin is a point of integer (voxelized) coordinates of precision corresponding to the sampling precision wanted for the rendering. The intersection (if any, dashed point 360) with one of the TriSoup triangles is then voxelized (=rounded to the closest point at the wanted sampling precision) and added to the list of rendered points.

After applying TriSoup to all leaf nodes, i.e., constructing triangles and obtaining points by ray tracing, copies of the same points in the list of all rendered points are discarded (i.e., only one voxel is kept among all voxels sharing the same position and volume) to obtain a set of decoded (unique) points.

For the sake of simplicity, from here, the following FIGS. 10 to 16 will depict a 2D volume (square) instead of a 3D volume (cuboid) associated with a leaf node. The reader will keep in mind that all methods described in this invention apply to the 3D space.

Figure 10:
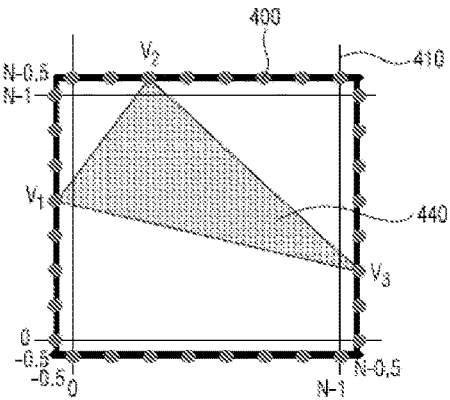
FIG. 10 is a schematic drawing of an example of a triangle in a leaf node of the octree in a 2D representation.

Referring to FIG. 10 showing an example of a N×N×N volume with $N=2^s=8$. There are at least three vertices $V_1$, $V_2$, and $V_3$ present on the edges 410 of the volume (depicted as a square on the figure, but actually a cuboid).

The edges of the leaf are located at positions −0.5 and N−0.5 to ensure continuity of the TriSoup model when passing from a volume to an adjacent volume. Practically, this means that the faces of cuboids are shared between adjacent volumes. By doing so, the position of a vertex present on an edge does not depend on the cuboid the edge belongs to.

Positions pk of vertices along their respective edges are quantized positions 400 and coded into the bitstream. These positions 400 may be quantized with a unitary step such that pk is an integer in the interval [0, N−1]. On the example of FIG. 10, one has $p_1=4$, $p_2=2$ and $p_3=2$.

A TriSoup triangle 440 is constructed from the vertices $V_1$, $V_2$, and $V_3$ and the set of triangles belonging to the volume models the point cloud encompassed by the volume.

Figure 11:
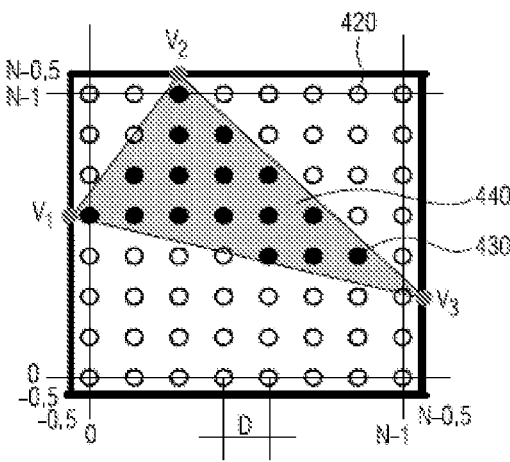
FIG. 11 is a schematic drawing of an example for the voxelization of FIG. 10.

The process of recovering points 430 (of the decoded point cloud) from the triangle 440 is called voxelization of the triangles. FIG. 11 shows the voxelization of the TriSoup triangle of FIG. 10. Rays are launched along all integer coordinates 420 (white and black dots), and rays intersecting the triangle lead to a part of the decoded points (black dots). Therein, the origins of the rays have a spacing D, which sets the sampling resolution for the voxelization.

Figure 12:
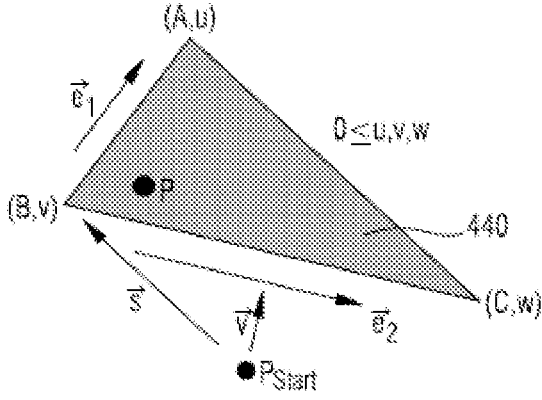
FIG. 12 is a schematic drawing of an example of barycentric coordinates of FIG. 10.

The intersection between a ray and a triangle is obtained by using the Möller-Trumbore algorithm, which determines the position of the intersection point by using barycentric coordinates, as depicted in FIG. 12.

Any point P of the 3D space can be uniquely represented by its barycentric coordinates relative to any non-degenerated 3D triangle ABC (equivalently any triangle $V_1V_2V_3$ from the TriSoup model).

Any point P of the 3D space can be uniquely represented by formula (1).

$$P = uA + vB + wC \qquad (1)$$

With the condition that u+v+w=1.

Points of the triangle correspond to the convex hull. Thus, 0≤u, v, w.

The Möller-Trumbore determines the values of u, v; and then w is found simply by v=1−u−v. According to FIG. 12, the ray is launched from a point $P_{start}$ with direction $\vec{v}$. Set the following notations for 3D vectors deduced from the 3D points as indicated in FIG. 12:

$$\vec{e_1} = \vec{BA}, \quad \vec{e_2} = \vec{BC} \quad \text{and} \quad \vec{s} = \vec{P_{start}B}.$$

The intersection point P between the ray and the unique plane passing through A,B,C is found by the following calculation:

$$\vec{h} = \vec{v} \times \vec{e_2}$$

$$a = \vec{e_1} \cdot \vec{h}$$

$$u = \vec{s} \cdot \vec{h}/a$$

-continued $$\vec{q} = \vec{s} \times \vec{e_1}$$

$$w = \vec{v} \cdot \vec{q}/a$$

$$t = \vec{e_2} \cdot \vec{k}/a$$

$$P = P_{start} + t\vec{v}$$

This intersection point P belongs to the triangle if and only if $0 \leq$ u, v, w.

Figure 13:
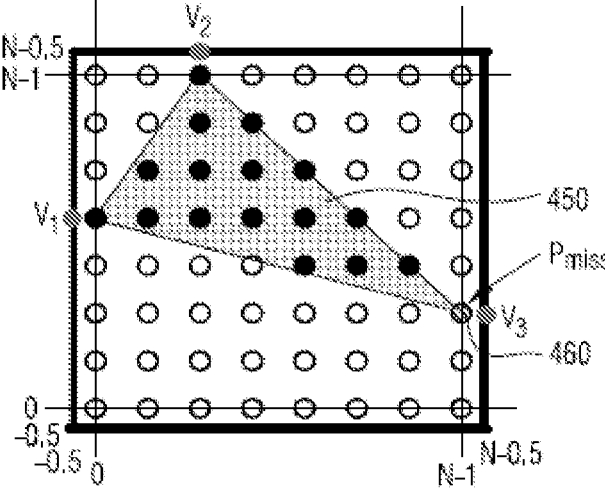
FIG. 13 is a schematic drawing of an example of comparison between the triangle by the vertices and the original point cloud.

There is a slight shift between the location of the TriSoup triangle $V_1V_2V_3$ determined by the vertices from the bitstream and the natural position of this triangle 450 in the current volume, as shown in FIG. 13. This position is natural because the encoder has deduced the location of vertices Vx from the closest (relative to the edge) points of the original point cloud. Therefore, it is very likely that the voxelized points in the immediate vicinity of the vertices $V_k$ are points of the point cloud. These points are natural candidates for constructing a "natural" triangle modeling the point cloud.

This shift is due to the continuity constraint through adjacent volumes. It leads to ray tracing missing some points 460 ($P_{miss}$ in FIG. 13) as these points do not belong to the TriSoup triangle (compared to the triangle 440 determined by the vertices provided by the bitstream as shown in FIG. 11). A direct consequence is a drop in quantitative geometry metrics and reduced rate-distortion performance of the scheme.

Thus, a "halo" is created around the TriSoup triangles by slightly relaxing the convex hull conditions $0 \leq$ u, v, w. By doing so, the sizes of the triangles are slightly increased such that ray tracing will intersect the increased triangles and miss less points $P_{miss}$.

The advantages of the proposed method are a lesser distortion of the decoded point cloud. Practically, quantitative metrics show a better PSNR that is increased by up to 0.5 dB for small 4×4×4 volume sizes and a maintained complexity because the overall algorithm is unchanged.

Figure 14:
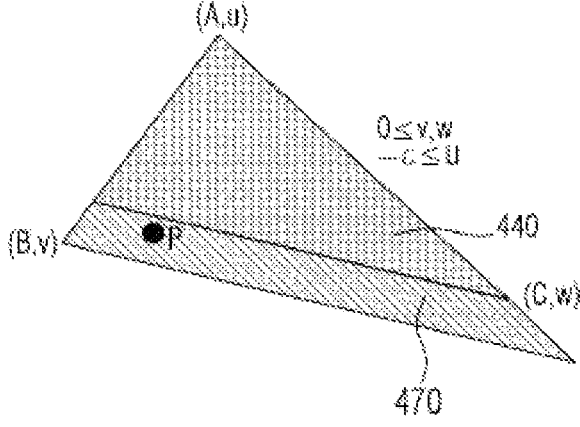
FIG. 14 is a schematic drawing of an example of the triangle of FIG. 10 in barycentric coordinates with extension along one direction.

Let $\varepsilon > 0$ be a halo parameter. As shown in FIG. 14, relaxing the condition $0 \leq$ u into $-\varepsilon \leq$ u, where u is the barycentric weight associated with the point A, increases the triangle along the edge BC opposite to the point A indicated by the dashed area 470.

Relaxation of the conditions may be applied to the three barycentric weights u, v, and w by changing the convex hull $0 \leq$ u, v, w into $-\varepsilon \leq$ u, v, w.

Figure 15:
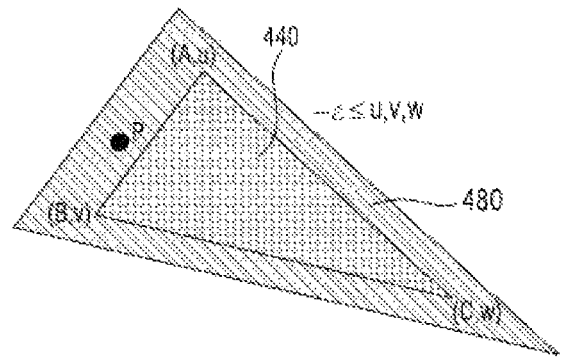
FIG. 15 is a schematic drawing of an example of the triangle of FIG. 10 with extensions along all three directions.

The obtained halo 480 around the triangle 440 is shown in FIG. 15. At first order approximation, the size of the halo is proportional to the parameter E.

In an embodiment, the halo parameter may depend on each barycentric weight of the triangle such as $-\varepsilon_u \leq$ u, $-\varepsilon_v \leq$ v, and $-\varepsilon_w \leq$ w. where $\varepsilon_u$, $\varepsilon_v$ and $\varepsilon_w$ are three halo parameters.

Figure 16:
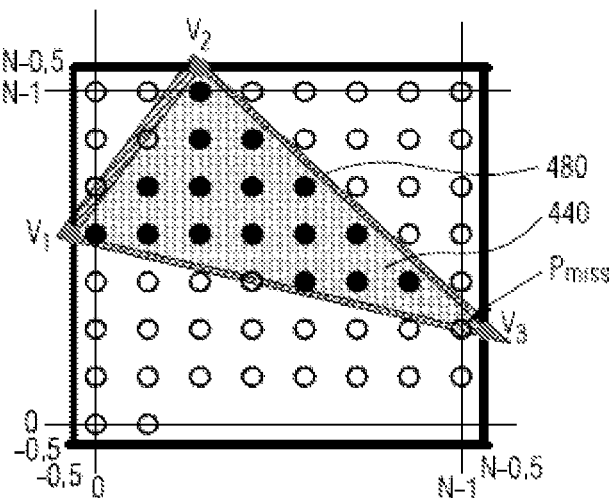
FIG. 16 is a schematic drawing of the representation of FIG. 11 with extensions in three directions.

The effect on the voxelization is depicted on FIG. 16 where the point $P_{miss}$ is now part of the halo 480 and, as such, is decoded as a point of the decoded point cloud. Therefore, it is not missed as in the original algorithm.

Of course, the value of the halo parameter $\varepsilon$ (alternatively $\varepsilon_u$, $\varepsilon_v$, and $\varepsilon_w$) must be set such that the halo has an adequate size. In case $\varepsilon$ is too small, the halo is very small and has almost no effect, thus falling back to the problem of missed points as in the prior art. In case & is too large, the halo becomes big, and the overall accuracy of the TriSoup model is impacted. In both cases, the distortion of the decoded point cloud is not optimal.

It has been observed that a reasonable value for the halo parameter $\varepsilon$ is around $\varepsilon \approx \frac{1}{4}$ or $\varepsilon \approx \frac{1}{8}$.

The halo parameter $\varepsilon$ (alternatively $\varepsilon_u$, $\varepsilon_v$; and $\varepsilon_w$) may be a fixed value. In a variant, the halo parameter $\varepsilon$ (alternatively $\varepsilon_u$, $\varepsilon_v$ and $\varepsilon_w$) is coded into the bitstream, for example, in the Geometry Parameter Set (GPS). In another variant, the halo parameter $\varepsilon$ (alternatively $\varepsilon_u$, $\varepsilon_v$, and $\varepsilon_w$) depends on the size N of the volume. In yet another variant, the halo parameter $\varepsilon$ (alternatively $\varepsilon_u$, $\varepsilon_v$, and $\varepsilon_w$) is signalled locally for a set of volumes representing the point cloud.

Figure 17:
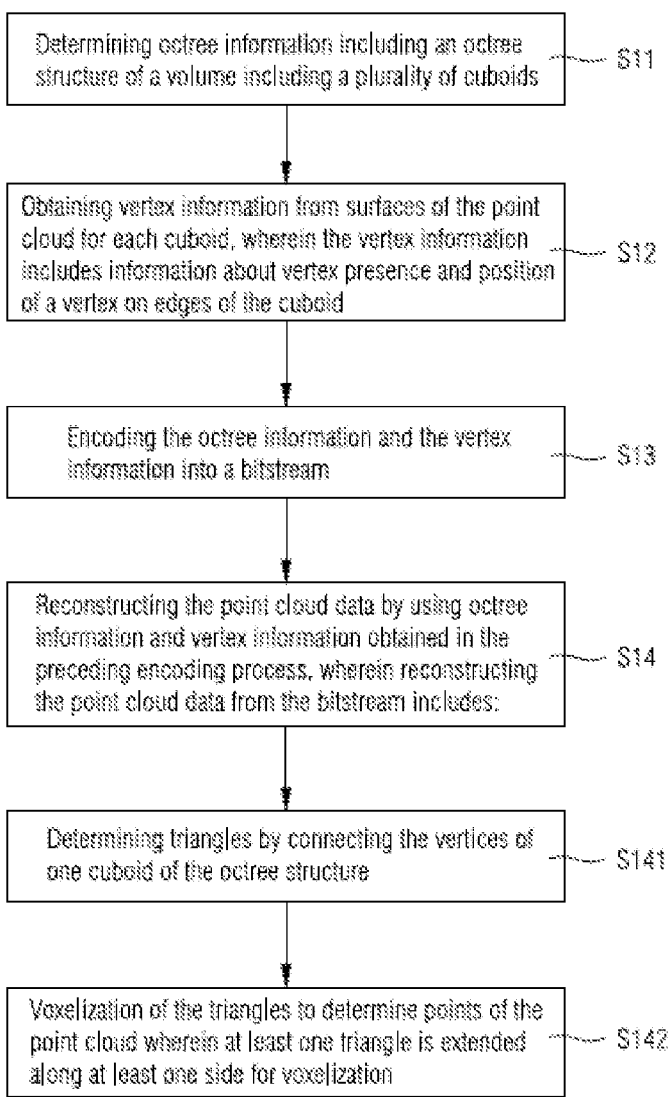
FIG. 17 is a schematic flow diagram of the method for encoding.

Referring to FIG. 17 showing a schematic flow diagram of the method for encoding a 3D point cloud into a bitstream according to the present invention. The method includes S11-S14.

In step S11, octree information is determined, including an octree structure of a volume including a plurality of cuboids.

In step S12, vertex information is obtained from surfaces of the point cloud for each cuboid relating to a leaf node, wherein the vertex information includes information about vertex presence and position of a vertex on edges of the cuboid.

In Step S13, the octree information and the vertex information are encoded into a bitstream.

In step S14, the point cloud data is reconstructed by using octree information and vertex information obtained in the preceding encoding process. Wherein reconstructing the point cloud data includes steps S141 and S142.

In step S141, triangles are determined by connecting the vertices of one cuboid relating to the leaf node of the octree structure. In step S142, voxelization of the triangles is performed to determine points of the point cloud. Wherein at least one triangle is extended along at least one side for voxelization.

Therein steps S11 to S13 relate to the known TriSoup encoding which is known for example from A. DRICOT, et al, "Adaptive multi-level triangle soup for geometry-based point cloud coding", 2019, IEEE 21st international workshop on multimedia signal processing (MMSP), Nakagami O.: "report on triangle soup decoding", ISO/IEC JTC1/ SC29-WG11 m52279, 2020, and U.S. Pat. No. 10,192,353. In addition, the usual encoding of the point cloud, the method includes a reconstruction step which includes the same or similar steps as that in the decoding method described before in particular with reference to FIG. 1. The reconstructed point cloud can then be used to interpolate attributes (like colors) and then encode attributes of the points of the point cloud based on reconstructed geometry.

The invention claimed is:

1. A method for decoding, from a bitstream, geometry of a three-dimensional (3D) point cloud, implemented in a decoder, comprising:

receiving and decoding the bitstream, wherein the bitstream contains octree information comprising information about an octree structure of a volume of the point cloud and vertex information comprising information about vertex presence and position of a vertex on edges of cuboids of leaf nodes of the octree structure;

determining triangles by connecting vertices of one cuboid relating to a leaf node of the octree structure; and voxelization of the triangles to determine points of the point cloud, and wherein at least one triangle of the triangles is extended along at least one side for voxelization, and an extension is provided by a halo parameter and the extension is set in advance.

2. A method for encoding a three-dimensional (3D) point cloud into a bitstream, implemented in an encoder, comprising:

obtaining octree information comprising an octree structure of a volume comprising a plurality of cuboids;

obtaining vertex information from surfaces of the point cloud for each cuboid relating to a leaf node of the plurality of cuboids, wherein the vertex information comprises information about vertex presence and position of a vertex on edges of the cuboid;

encoding the octree information and the vertex information into a bitstream;

reconstructing point cloud geometry data by using octree information and vertex information obtained in a preceding encoding process, wherein reconstructing the point cloud geometry data comprises:

determining triangles by connecting vertices of one cuboid relating to a leaf node of the octree structure; and voxelization of the triangles to determine points of the point cloud, and wherein at least one triangle of the triangles is extended along at least one side for voxelization, and an extension is provided by a halo parameter and the extension is set in advance.

3. The method according to claim 2, wherein the encoding is a Trisoup encoding.

4. The method according to claim 1, wherein the at least one triangle is extended at two sides or three sides for voxelization.

5. The method according to claim 1, wherein each triangle in a cuboid is extended, or at least one triangle in each cuboid of the point cloud having a triangle is extended.

6. The method according to claim 1, wherein the at least one triangle is extended a same extension for each side, or the at least one triangle is extended a different extension for at least two sides.

7. The method according to claim 1, wherein a Möller-Trumbore algorithm is used for voxelization, and/or voxelization of a point is obtained by rounding coordinates of the point to nearest integers.

8. The method according to claim 7, wherein a convex hull requirement is $-\varepsilon \leq u,v,w$, $\varepsilon > 0$, and u, v, and w are barycentric coordinates of the triangle.

9. The method according to claim 7, wherein a convex hull requirement is $-\varepsilon_u \leq u$, $-\varepsilon_v \leq v$ and $-\varepsilon_w \leq w$, $\varepsilon_u$, $\varepsilon_v$, $\varepsilon_w > 0$, u, v, and w are barycentric coordinates of the triangle, and at least one of $\varepsilon_u \neq \varepsilon_w$, $\varepsilon_u \neq \varepsilon_v$, or $\varepsilon_v \neq \varepsilon_w$.

10. The method according to claim 1, wherein the extension is provided by a halo parameter, and the halo parameter of the extension is at least one of less than ¼ of sampling precision of the voxelization or less than ⅛ of the sampling precision of the voxelization.

11. The method according to claim 1, wherein an extension is provided by a halo parameter and the halo parameter is encoded in the bitstream, or in a Geometry Parameter Set.

12. An encoder to encode a three-dimensional (3D) point cloud into a bitstream, the encoder comprising at least one processor and a memory, wherein the memory stores instructions when executed by the at least one processor perform operations comprising:

obtaining octree information comprising an octree structure of a volume comprising a plurality of cuboids;

obtaining vertex information from surfaces of the point cloud for each cuboid relating to a leaf node of the plurality of cuboids, wherein the vertex information comprises information about vertex presence and position of a vertex on edges of the cuboid;

encoding the octree information and the vertex information into a bitstream;

reconstructing point cloud geometry data by using octree information and vertex information obtained in a preceding encoding process, wherein reconstructing the point cloud geometry data comprises:

determining triangles by connecting vertices of one cuboid relating to a leaf node of the octree structure; and voxelization of the triangles to determine points of the point cloud, and wherein at least one triangle of the triangles is extended along at least one side for voxelization, and an extension is provided by a halo parameter and the extension is set in advance.

13. A decoder to decode a three-dimensional (3D) point cloud from a bitstream, the decoder comprising at least one processor and a memory, wherein the memory stores instructions when executed by the at least one processor cause the processor to perform the steps of the method according to claim 1.

14. A bitstream encoded by the method according to claim 2.

15. A non-transitory computer-readable storage medium comprising instructions when executed by a processor, causes the processor to perform the steps of the method according to claim 1.

16. The method according to claim 2, wherein the at least one triangle is extended at two sides or three sides for voxelization.

17. The method according to claim 2, wherein each triangle in a cuboid is extended, or at least one triangle in each cuboid of the point cloud having a triangle is extended.

18. The method according to claim 2, wherein the at least one triangle is extended a same extension for each side, or the at least one triangle is extended a different extension for at least two sides.

19. The method according to claim 2, wherein a Möller-Trumbore algorithm is used for voxelization and/or voxelization of a point is obtained by rounding coordinates of the point to nearest integers.

\* \* \* \* \*